(12) United States Patent  
Wright et al.

(10) Patent No.: US 9,110,088 B1  
(45) Date of Patent: Aug. 18, 2015

(54) PROPAGATION MEDIUM VELOCITY MEASUREMENT SYSTEM

(71) Applicants: Selwyn E. Wright, Kirkburton (GB); Kelvin F. Wright, Saratoga, CA (US)

(72) Inventors: Selwyn E. Wright, Kirkburton (GB); Kelvin F. Wright, Saratoga, CA (US)

( * ) Notice: Subject to any disclaimer, the term of this patent is extended or adjusted under 35 U.S.C. 154(b) by 0 days.

(21) Appl. No.: 14/301,188

(22) Filed: Jun. 10, 2014

Related U.S. Application Data

(60) Provisional application No. 61/937,953, filed on Feb. 10, 2014.

(51) Int. Cl.  
*G01P 3/36* (2006.01)

(52) U.S. Cl.  
CPC .................................. *G01P 3/36* (2013.01)

(58) Field of Classification Search  
CPC ............. G01P 3/366; G01P 3/36; G01P 5/26; G01S 17/50; G01S 17/58  
See application file for complete search history.

(56) References Cited

U.S. PATENT DOCUMENTS

| | | | | |
|---|---|---|---|---|
| 4,717,916 | A * | 1/1988 | Adams et al. | 342/107 |
| 6,424,407 | B1 * | 7/2002 | Kinrot et al. | 356/28 |
| 6,664,708 | B2 * | 12/2003 | Shlimak et al. | 310/313 R |
| 6,813,006 | B1 | 11/2004 | Wang et al. | |
| 7,010,962 | B2 * | 3/2006 | Sinha | 73/54.15 |
| 7,502,587 | B2 * | 3/2009 | Petruzzelli | 455/3.02 |
| 7,586,587 | B1 | 9/2009 | Wang et al. | |
| 2002/0085194 | A1 * | 7/2002 | Yamashita | 356/73.1 |
| 2006/0212280 | A1 | 9/2006 | Ross | |
| 2007/0247620 | A1 * | 10/2007 | Koo | 356/301 |

FOREIGN PATENT DOCUMENTS

| | | |
|---|---|---|
| EP | 0175424 A3 | 7/1987 |
| EP | 0286598 A3 | 7/1991 |

OTHER PUBLICATIONS

S.E. Wright, "Electromagnetic Sources and Observers in Motion I—Evidence Supporting the EM Propagation Medium for the Transmission of Light", Progress in Electromagnetics Research Symposium Proceedings. Xi'an, China (Mar. 26, 2010).

S.E. Wright, "Electromagnetic Sources and Observers in Motion II—Einstein's Ether-less Relativity Versus Lorentz's Medium Based Theory", Progress in Electromagnetics Research Symposium Proceedings. Xi'an, China (Mar. 26, 2010).

S.E. Wright, "Electromagnetic Sources and Observers in Motion III—Derivation and Solution of the Electromagnetic Motional Wave Equation", Progress in Electromagnetics Research Symposium Proceedings. Cambridge, USA (Jul. 5-8, 2010).

S.E. Wright, "Electromagnetic Sources and Observers in Motion IV—The Nature of Gravity and Its Effect on the Propagation Medium", Progress in Electromagnetics Research Symposium Proceedings. Cambridge, USA (Jul. 5-8, 2010).

(Continued)

*Primary Examiner* — Luke Ratcliffe  
*Assistant Examiner* — Samantha K Abraham  
(74) *Attorney, Agent, or Firm* — Beyer Law Group LLP

(57) ABSTRACT

An apparatus measures an electromagnetic signal (e.g., light) propagation time delay that varies with system speed relative to its propagation medium. A one-way light propagation time measurement in the medium between two fixed points moving relative to the medium is used. The delay is compared with light propagating in a constant reference path that is independent of motion. A two-way system is also used, as well as increasing sensitivity through a light zigzag and fiber optic coil delay. The apparatus is a compact and extremely sensitive speedometer.

32 Claims, 7 Drawing Sheets

Measurement System

(56) References Cited

OTHER PUBLICATIONS

S.E. Wright, "Electromagnetic Sources and Observers in Motion V—A Revised Theory of Relativity", Progress in Electromagnetics Research Symposium Proceedings. Marrakesh, Morocco (Mar. 20-23, 2011).

S.E. Wright, "Electromagnetic Sources and Observers in Motion VI—New Motional Optics", Progress in Electromagnetics Research Symposium Proceedings. Marrakesh, Morocco (Mar. 20-23, 2011).

S.E. Wright, "Electromagnetic Sources and Observers in Motion VII—Medium Support for a New Relativity Theory", Progress in Electromagnetics Research Symposium Proceedings. Moscow, Russia (Aug. 19-23, 2012).

S.E. Wright, "Electromagnetic Sources and Observers in Motion VIII—New Relativity Theory Establishes Einstein's Ether-less Aspect of Relativity as Irrational", Progress in Electromagnetics Research Symposium Proceedings. Moscow, Russia (Aug. 19-23, 2012).

S.E. Wright, "Electromagnetic Sources and Observers in Motion IX—Nature of Gravity" Paper IX of X Progress in Electromagnetics Research Symposium Proceedings. Stockholm, Sweden (Aug. 12-15, 2013).

S.E. Wright, "Electromagnetic Sources and Observers in Motion X—Unification of Electromagnetism and Gravity" Paper X of X Progress in Electromagnetics Research Symposium Proceeding. Stockholm, Sweden (Aug. 12-15, 2013).

\* cited by examiner

Sagnac's Rotating Mirrors

Linear System

Gravitational Entrainment Model

Propagation Path
Delay Extensions

PROPAGATION MEDIUM VELOCITY MEASUREMENT SYSTEM

This application claims priority of U.S. provisional patent application No. 61/937,953, filed Feb. 10, 2014, entitled "Propagating Medium Velocity Measuring System," which is hereby incorporated by reference.

FIELD OF THE INVENTION

The present invention relates generally to measuring the speed of an apparatus on Earth or in outer space. More specifically, the present invention determines a phase difference of light beams in order to calculate speed of the apparatus.

BACKGROUND OF THE INVENTION

It is self evident that all measured motions require a reference. Although, according to Einstein (1905), there is no preferred reference frame, that is, no propagation medium or "ether" required for comparing (measuring) motion of objects or electromagnetic waves (light). Einstein claimed that only relative motion between systems was important, not motion relative to a propagation medium, without specifying any alternative transmission mechanism in place of the medium (inferring that light does not require a propagation medium). This claim is in direct conflict with the basic electromagnetic (EM) wave theory developed by Maxwell (1865) who established EM wave propagation, predicting the transmission of light based on a since-measured propagation medium. Further, an ether-less Universe is not supported by Lorentz's (1899) motional transform, which is also shown to be based on Maxwell's propagation medium. Techniques concerning measuring motion in space relative to such a medium, however, have been discouraged or believed not possible. Logically (according to these beliefs), if there is no propagation medium, and space is empty, then it should be impossible to measure motion in space.

The Michelson and Morley Experiment (MMX) (1887) designed to measure the Earth's motion with respect to the propagation medium, was an insensitive method of measuring motion. Even if there were relative motion with respect to the medium, at Earth orbital speeds of 30 km/s (or Mach number $M=v/c=10^{-4}$, where v is the system velocity and c is the speed of light), only a small fraction of an interference fringe ($2\pi$ radians) would have been measured, and at Earth's rotation speed of 480 m/s ($M\approx1.5\times10^{-6}$) nothing would have been detected. Because the MMX failed to detect the relative motion of the Earth through any propagation medium, this negative result was interpreted as evidence against the existence of a propagation medium. Even if the system had been sensitive enough to detect relative motion, no motion would have been detected, as shown below, because the propagation medium moves with the Earth.

To establish motion with respect to the medium at practical speeds on Earth, as well as at higher speeds in outer space, a more sensitive measurement system would have been required. The MMX was insensitive because it was based on a second order velocity term ($M^2$) as explained below. The MMX relied on the difference in the propagation times in each direction in a round trip propagation measurement, where the propagation differences in each direction tended to cancel one another. One of the main reasons why the propagation medium is not readily detectable is that there is no existing dedicated measurement system sensitive enough to detect linear motion relative to the medium.

It is shown that Sagnac (1913) demonstrated rotary motion relative to the propagation medium. Sagnac split a beam of light into two beams traveling in opposite directions using a beam splitter. The beam splitter is used to measure the propagation delay in and against the direction of rotating mirrors, relative to the propagation medium. Sagnac reflected light, around a loop relative to the Earth's surface, using a rotating square of four mirrors. FIG. 1 shows Sagnac's mirror system 10 including a rotating frame 20a and 20b, mirrors 31-34 (mirror 31 being a half-silvered mirror), a radius 42, a side length l 44, and an angular velocity 46. A light source 50 projects a beam of light which is split by mirror 31; both beams travel in opposite directions and end at a detector 55. One light beam propagates in the medium against the mirror motion, counter-clockwise. The other light beam propagates in the medium with the direction of mirror motion, clockwise, through the half-silvered mirror. The mirror system 10 must have caused the shift in interference fringes as a consequence of the different distances that light traveled in the propagation medium (stationary on the Earth's surface) due to the rotation of the mirror system relative to the propagation medium. If there had been no medium, or if the medium rotated with the mirrors, there would have been no effect, no relative motion, and no Propagation Time Asymmetry (PTA).

In system 10, light passes around the mirrors having a peripheral distance d (d=41) in a propagation time $t=\pm d/c$ (depending on the light direction), where c is the speed of light at the Earth's surface. If the mirror system rotates with an angular velocity v then the incremental distance traveled in time t (by the spinning mirrors) is $\Delta d=vt=\pm vd/c$. The incremental prediction equation for the propagation time asymmetry (PTA) is shown below in Equation (1).

$$\Delta t=\Delta d/c=vd/c^2=Mt, \text{ where } M=v/c<<1 \qquad (1)$$

The incremental time $\Delta t$ between the light beams was measured through interference fringe movement in an interferometer at the detector. By measuring $\Delta t$ and knowing d and c, the angular velocity of the spinning mirrors at the Earth's surface can be calculated exactly according to Equation (1) and Maxwell's EM wave theory, providing the medium is at rest on the Earth's surface. Although Sagnac demonstrated that his result confirmed the existence of Maxwell's stationary propagation medium, others maintained that the Sagnac effect was consistent with special relativity and that the medium did not exist. This is not possible; unless Maxwell's wave theory, based on a propagation medium, is shown to be in error, which is not the case, as it has been reliably used for over 150 years. Also, any relativistic effects at these mirror speeds are negligible compared to Sagnac's classical PTA effect.

Recent patents for measuring motion in space are, for example, those of Wang et al. (U.S. Pat. Nos. 6,813,006 and 7,586,587). In the first patent they proposed to measure motion by measuring the time difference of light passing through two different media. In the second they proposed to measure motion using two beams of interfering light. The resulting interference pattern (standing wave) is used to calculate the system speed. But these patents do not identify any mechanism by which the propagation occurs, i.e., whether it is relative to the Earth's surface, to a vacuum medium or to some other unknown process. A non-preferred reference is not an option in electromagnetic theory; it is not a solution of Maxwell's EM wave equation, it is non-causal (non predictable). If the Earth's surface is assumed to be the reference then the motion will be defined relative to the propagation medium stationary on the Earth's surface. Therefore, it is recognized that improved and consistent techniques for measuring speed in outer space as well as on Earth are desirable.

SUMMARY OF THE INVENTION

To achieve the foregoing, and in accordance with the purpose of the present invention, a technique for measuring speed is disclosed.

A system measures a signal (e.g., light) propagation time delay that varies with system speed relative to its propagation medium. This velocity measurement system uses a one-way light propagation time measurement in the medium between two fixed points moving relative to the medium. The delay is compared with light propagating in a constant reference path, independent of motion, by a phase comparator (there is no relative motion between the source, transmission path and receiver). A two-way system and methods of increasing the sensitivity through a light zigzag and fiber optic coil delay are also described, creating a compact and an extremely sensitive speedometer.

The system can measure motion with respect to the propagation medium moving with the Earth, or can measure motion relative to the propagation medium generally at rest away from gravitational bodies in outer space. The apparatus can determine the velocity of spacecraft, probes, satellites, rockets, etc. (even if they are light years from any object). It can also measure a system velocity with respect to the ground without the use of satellites (GPS), by measuring motion relative to the propagation medium stationary on the Earth's surface.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

As mentioned above, the MMX relied on the difference in the propagation times in each direction in a round trip propagation measurement, where the propagation differences in each direction tended to cancel one another. Moreover, the null result obtained by the MMX is now explained by the existence of a boundary layer propagation medium located between the medium moving with the rotating surface of the Earth and the surrounding stationary medium. In other words, the MMX demonstrated that light propagation on or near the surface of the Earth, through a fixed optical system, was unaffected by the Earth's motion through the Universe because the boundary layer rotates with the Earth's surface (on or near the Earth's surface), i.e., there is no relative motion between a measuring optical system on the Earth's surface and the Earth's motion through the Universe.

Propagation Medium

Others have noted the presence of a propagation medium (historically, the "ether," "aether" or "luminiferous aether"). The medium was established by Maxwell in 1865, and the solution of the EM wave equation (the foundation of all electromagnetic theories) was based on a propagation medium. If the medium did not exist then Maxwell's theory and today's EM theories would be in error, which is not true. Dark Energy and the Higgs Field are both gaining acceptance based on the notion of a propagation medium; further, Maxwell's propagation medium and recent investigations (Wright, 2010-2013) have confirmed the medium's existence. Space, it appears, is not uniformly empty (homogeneous) as Einstein claimed. The propagation medium is found to be basically at rest in space, but does move with gravitational bodies (e.g., planets), making EM propagating disturbances (light) predictable (causal). More specifically, it appears that a large gravitational body attracts not only a boundary layer propagation medium rotating with its surface, but also an orbital medium region above the boundary layer having a much larger extent; this orbital region is stationary around and moves with the body in orbit. Whereas Einstein's non-preferred, homogeneous, uniformly empty space, which underestimates the complexity, cannot without a medium describe the situation. A uniformly empty space (no medium) is not a solution of Maxwell's wave equation, it is non-causal, and it cannot be used to predict wave propagation or to distinguish between wave propagation in the various medium motional situations around a gravitational body (e.g., a planet) or in outer space.

Figure 2:
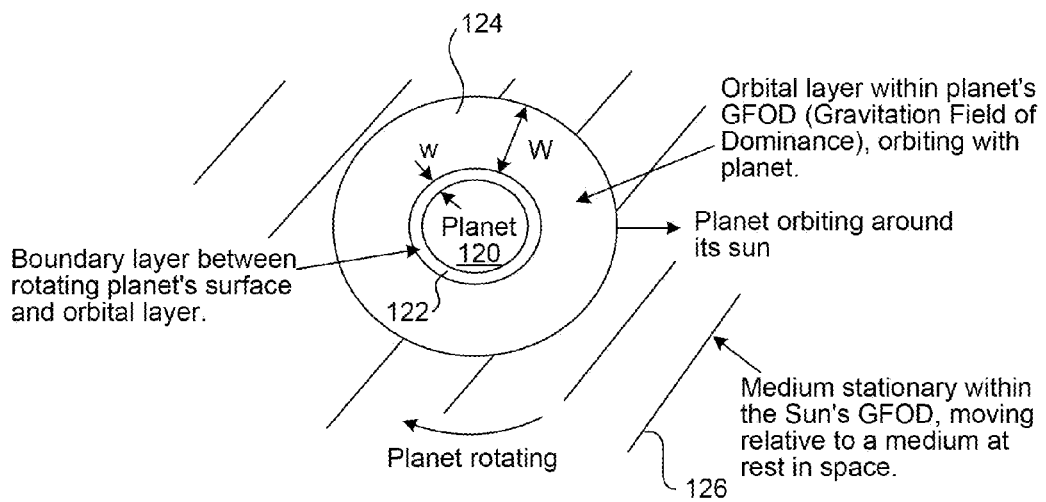
FIG. 2 illustrates a propagation medium-based gravitational entrainment model.

FIG. 2 illustrates a propagation medium-based gravitational entrainment model that appears to fit all known data. Shown are propagation medium profiles around a rotating and orbiting planet 120. A boundary layer propagation medium 122 having width w rotates with the planet and is thus stationary with respect to the planet at the planet's surface. Being a boundary layer, there is a gradient from the planet's surface to the outer edge of the layer 122. At the outer edge the boundary layer is stationary with respect to the surrounding medium 124; while the inner edge at the planet's surface is not moving with respect to the planet's surface (it is rotating with the planet's surface). The layer 122 is smoothly graded between the two velocities (i.e., there is no discontinuity). The extent of this boundary layer 122 on Earth is less than about 10 km (from the Earth's surface), according to Hafele and Keating's (1972) measurements.

A propagation medium orbital region 124 is attracted to and orbits with the planet and is thus stationary with respect to the orbiting planet (i.e., it is non-rotating, unlike the lower side of the boundary layer on the planet's rotating surface). This orbital region surrounding the Earth is confirmed further through Saburi et al. (1976) satellite communications and GPS (1992) satellite navigation systems operating in this orbital region. The extent of this region appears to be controlled by the planet's gravitational field of dominance (GFOD) in the presence of the Sun's gravitational field of influence. In the Earth's case, the orbital region 124 appears to have an extent of approximately W=50 Earth radii (calculated from the center of the Earth, as illustrated in FIG. 2. Further, the predicted symmetry in time slowing of atomic clocks moving relative to the Earth's axis (but not to its rotating surface) according to Hafele and Keating (1972) confirms that the orbital region above an altitude of about 10 km is stationary, i.e., it is not rotating with the Earth's surface.

The orbital region 124 is shown to move relative to a propagation medium 126 surrounding the Sun which is stationary with respect to the Sun and its own gravitational field of dominance. Medium 126, in turn, is moving relative to a propagation medium at rest in outer space (e.g., space between solar systems and gravitational masses within their galaxy. If the planet rotates it forms a velocity gradient (boundary layer) above the planets' surface.

Therefore, the MMX (1887) demonstrated that light propagation on the Earth's surface, through a fixed optical system, was unaffected by the Earth's motion through the Universe because the boundary layer propagation medium on the Earth's surface separated the effects of Earth orbital motion through the stationary medium surrounding the Sun from the medium rotating with the Earth's surface. Sagnac (1913) showed that motion of his rotating mirrors, relative to the Earth's surface and stationary medium on the Earth, in and against the light direction, caused Propagation Time Asymmetry (PTA). Michelson and Gale (1925) established that the medium clings to the Earth's surface and moves progressively faster from the poles to the equator. This causes a measured difference in light propagation time (speed) over the same distance, at different latitudes on the Earth's surface, revealing the Earth's rotational speed relative to the surrounding stationary medium.

These three experiments establish that a boundary layer medium immediately above the Earth's surface exists and separates the Earth's surface from the orbital stationary medium region above (which surrounds and orbits with the Earth at higher altitudes). Again, these effects are based on classical physics; the relativistic effect at these speeds is negligible, unless integrated over a considerable period of time.

In the absence of gravitational matter, the propagation medium in the Universe appears to be stationary, on average, providing a universal reference for motion. The cosmic microwave background (CMB) detected by Penzias and Wilson (1965), is shown to be EM radiation, propagating uniformly in all directions, throughout the Universe, relative to the propagation medium basically at rest in space. The stationary medium has also been confirmed through the Cosmic Background Explorer COBE (1992). Here, the CMB energy collection increases with system motion relative to the stationary medium, similar to trawling fish nets catching more fish than stationary ones. This model, with the stationary medium surrounding the Earth, is supported by the results from NASA's Gravity Probe B (2011).

If the Universe is found to be expanding at an appreciable rate, then it is believed the propagation medium will expand with it. Although the exact nature of the propagation medium is not known, it has measurable properties in a vacuum in space. These properties are electrical permeability (inductance or "inertia") $\mu=1.25\times10^{-6}$ N/A$^2$ and electrical permittivity (capacitance or "stiffness") $\text{ę}$ (or $\epsilon$)=$8.85\times10^{-12}$ F/m, which enables EM waves to propagate or "bounce" through a vacuum medium in space.

Figure 1:
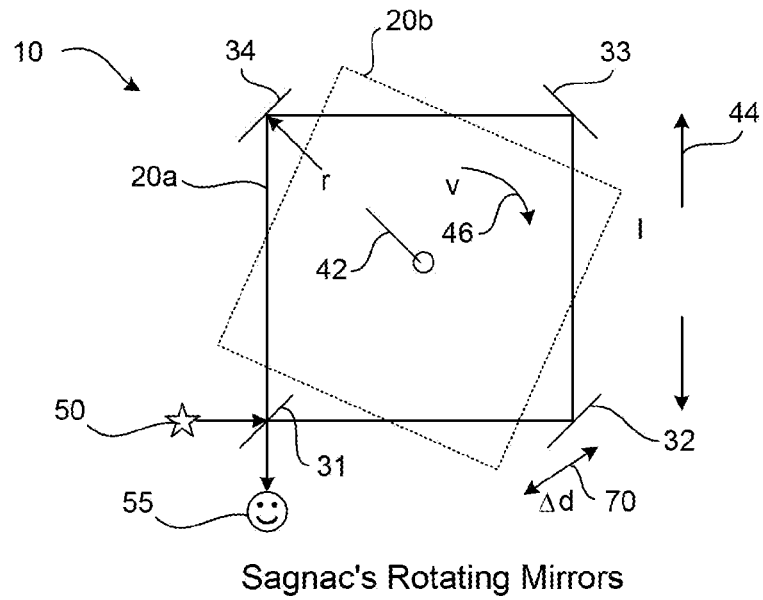
FIG. 1 shows Sagnac's prior art mirror system.

Based on these observations, we have realized that the sensitivity can be increased by many orders of magnitude (e.g., $10^6$) compared with the MMX, by measuring the propagation time in one direction only, given by Equation (2) below, or in opposite directions, separately. The proposed method is based on the Sagnac (1913) effect. Referring back to FIG. 1, the reason why Sagnac's technique and the prediction equation work, is that it is predicted through a causal solution of Maxwell's EM wave equation based on the propagation medium at rest on the Earth's surface. In other words, Sagnac's rotating mirrors generated a propagation delay ($\Delta d$) through motion relative to this propagation medium, thus establishing the medium's presence. There is no other physical explanation to account for this result. If the medium were not present, or rotated with the mirrors, there would be no measured effect.

Relativistic effects have been offered to explain this motional effect of Sagnac. But, the relativistic explanation is lacking; not only do relativistic effects require a medium, but also these relativistic effects are negligible at the mirror speeds and small integration times compared to the instantaneous classical Propagation Time Asymmetry (PTA) calculated by the prediction Equation (1) above. This is shown in Section 3.5 using equations in Section 8 in a summary paper of the book *Unification of Electromagnetism and Gravity*, by Selwyn E. Wright, published 2014 by Trafford publishing, (included in the U.S. provisional application referenced above) both are hereby incorporated by reference.

Thus, it can be shown that a propagation medium does exist and that the Sagnac effect is based upon the existence of this medium. Having made this realization, other conclusions and the present invention are possible, including applying the invention to linear motion on and beyond the Earth's surface.

Velocity Measurement System

Figure 3:
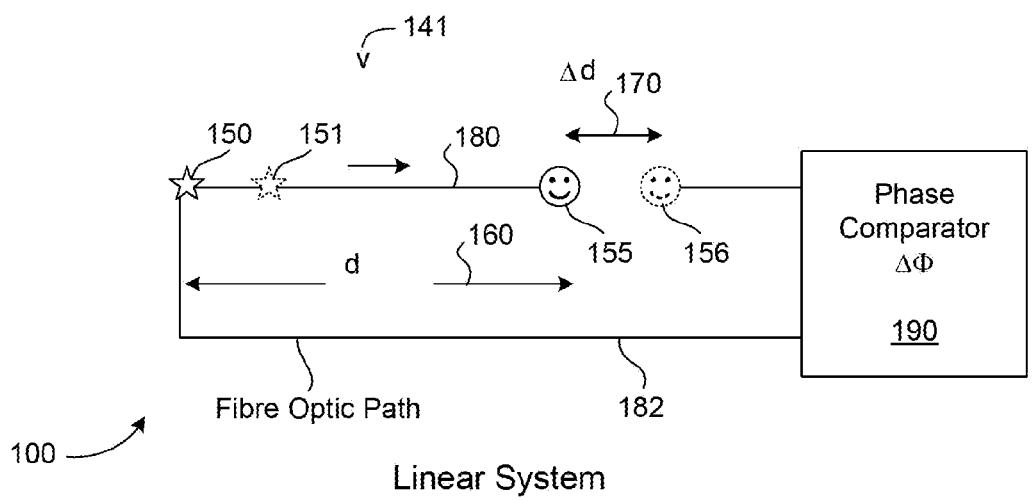
FIG. 3 illustrates a linear velocity measurement system based on the Sagnac effect.

FIG. 3 illustrates a linear velocity measurement system 100 based on the Sagnac effect and the realization that a propagation medium exists. The technique measures the speed of linear motion, without the need of the rotating mirror system. System 100 has a velocity, v 141, and includes a source 150 and a receiver 155 separated by distance d 160, a path 180 (through a vacuum or air, for example), a fiber optic path 182, and a phase comparator 190. Symbols 151 and 156 illustrate the movement of the system after a given time. Because the system has a velocity, a first light beam emitted from source 150 will actually travel a distance equal to d 160 plus $\Delta d$ 170 before the light beam reaches the receiver 156. The beam can be split at source 150 and a second beam focused into, and travels via, a fiber optic path 182 directly to the phase comparator; this beam will travel a fixed distance because there is no relative motion on this path. At the comparator, a photo-electric converter (or two converters) converts the first light beam and the second light beam into electrical signals ready to be compared in the comparator. The second photo-electric converter can be moved directly in contact with the light source, with a metal wire connecting directly to the comparator, so as to eliminate the beam splitter and fiber optic cable. As is known, the comparator is able to measure and detect phase differences between two electrical sinusoidal signals.

The PTA between the two light beams may then be compared. In other words, a time measurement of the variable propagation distance via path 180 (in the direction of motion, via the propagation medium) is now compared with a fixed (invariant) propagation distance through the fiber optic cable path 182 connected directly between the light source 150 and the comparator 190 (the comparator being capable of comparing time or phase changes). There is no relative motion between the light source, the fiber optic cable and comparator, making this path phase invariant with respect to the speed of the system. It does not matter what the fiber optic cable length is as long as it is constant. We are not comparing exact propagation distances or times, only changes in times through motion. The actual phase difference is not important as long as the phase is constant in the fiber optic path, independent of system motion, which is the case because there is no relative motion in the source-fiber-comparator path; they all move together.

This one-way propagation time measurement is approximately one million times more sensitive than the round trip propagation used in the MMX. The invention works on the Earth's surface. Furthermore, accepting the propagation medium's presence and its non-homogeneity, allows the invention to measure motion with respect to the medium anywhere in the Universe, e.g., not only on gravitational bodies but also in outer space.

Figure 4:
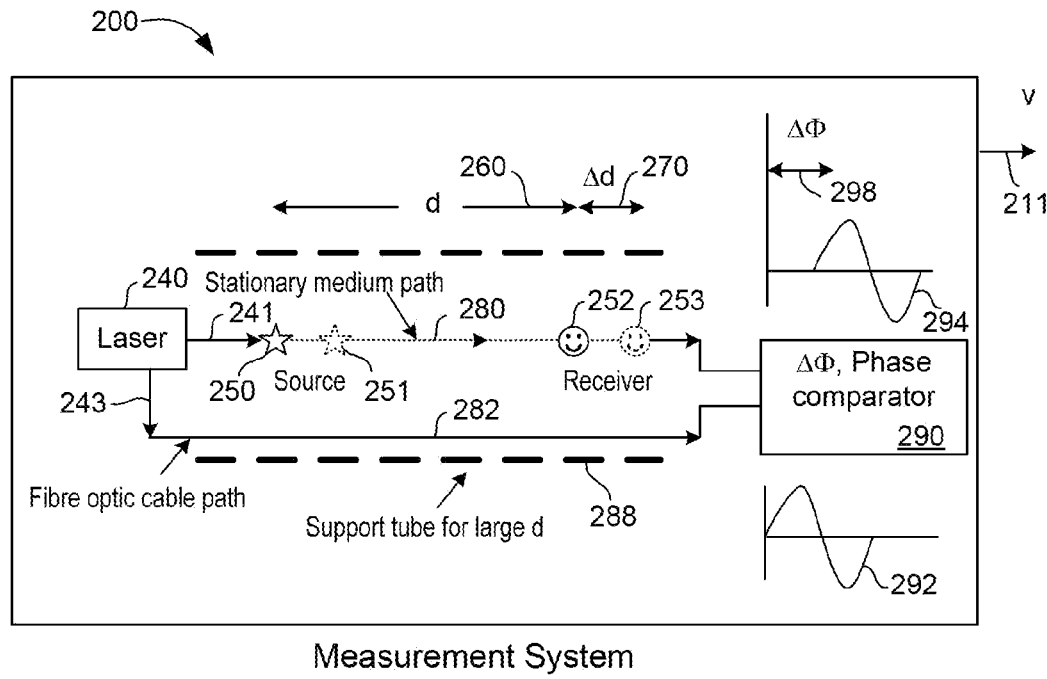
FIG. 4 is a block diagram showing a measurement system with a velocity v.

FIG. 4 is a block diagram showing a measurement system 200 having a velocity v, 211. Included is a coherent light source 240, such as a laser, emitting a narrow light beam 241 in the direction of the system motion from a source 250 through a vacuum path 280 (or through an air path on Earth). This first light beam is received at a receiver 252, which may be a photo-electric converter such as a photo cell, photo diode or equivalent, converting the light into an electrical signal, which is then transmitted to the comparator 290 through a metal wire. Distance d 260 is a fixed distance between the source and receiver within the system. Delta d 270 is the additional distance that the light beam 241 travels due to the system velocity.

The light beam is split producing a second beam 243, and a second light path 282 (a reference signal) connects the laser 240 directly through a fiber optic cable to another photo-electric converter at the comparator 290. The propagation time through the fiber optic cable will be independent of the system motion because the light source 240, the fiber optic cable and comparator all move together with the system, i.e., there is no relative motion of the fiber optic cable with respect to the system 200. The two electrical outputs from the two photo-electrical converters are compared at the electrical comparator 290. Graph 292 represents the second light beam via path 282 and graph 294 represents the first light beam via path 280 relative to the second light beam. Shown is a phase difference 298. The two phases of both light beams are compared at the comparator 290 and are used to calculate the system speed v 211 as described below with respect to FIG. 7. A support tube 288 may be provided for rigidity and protection for large separation distances d 260. Instead of a beam splitter, a light siphon may be used to siphon the second light beam from the first light beam. The comparator may even measure the phases of the light beams directly from the electrical laser signal without the need of a photo-electric converter.

In another embodiment, a fiber optic cable is not needed on path 182. The reference signal does not have to be sent down the path 282 as a light beam; it can be an electrical signal. In this embodiment, the laser source is monitored by a photo-electric converter at the light source, which converts the received second light beam into an electrical signal (measuring both the frequency and phase of the source) and transmits the signal directly to the phase comparator 290 through a metal wire (for example) to be compared with the electrical signal from the first light beam. Even thought there will be a very small air gap between the source of the second beam and the photo-electric converter at the light source (which will cause the second light beam to travel an extremely small distance in addition to d), this air gap will introduce a negligible error as long as the gap size is a small fraction of d. For example, if the air gap is 1% of d it will introduce a 1% error in the speed measurement. Further, the converter can be in direct contact with the light source, or its electrical signal derived directly from the light source.

In yet another embodiment, a mechanism other than a fiber optic cable may be used if the electromagnetic signal is other than a visible beam of light. For example, if the electromagnetic signal uses a microwave source, then path 282 may use metal wire instead of a fiber optic cable. Or, if the electromagnetic signal has a frequency higher than that of visible light (e.g., ultraviolet light), then path 282 may use an optical cable with a UV bandwidth. One of skill in the art will be able to choose the appropriate mechanism for transmitting a suitable electromagnetic signal from source 240 to an appropriate converter via path 282 in order to ensure that the distance traveled by the electromagnetic signal on path 282 is independent of the velocity of system 200.

Figure 5:
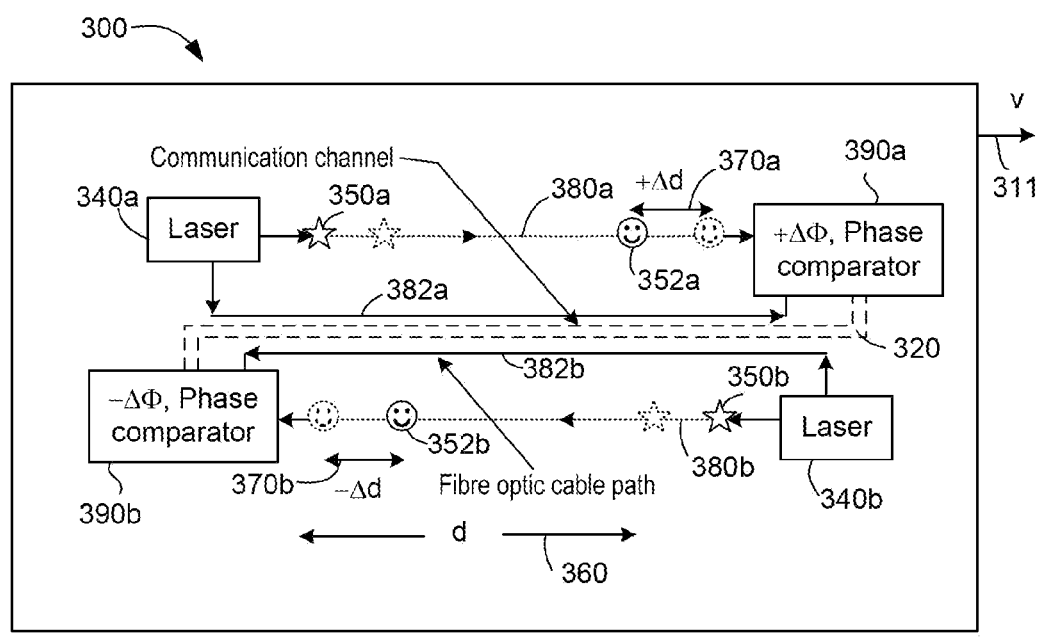
FIG. 5 is a block diagram showing a two-way measurement system with a velocity v.

FIG. 5 is a block diagram showing a two-way measurement system 300 having a velocity v, 311. Distance d 360 is the distance between source 350$a,b$ and receiver 352$a,b$. In this embodiment, two one-way systems, each moving relative to the propagation medium, are shown facing in opposite directions. This arrangement creates phase differences in each direction in the two phase comparators 390$a$ and 390$b$. The electrical outputs from the two comparators are transmitted via a communication channel 320 (the channel being conducting metal, a fiber optic cable, a wireless signal, etc.). A computing device (computer, laptop, handheld device, integrated circuit, analog circuit, etc., not shown in this figure) receives the outputs from both comparators 390$a$ and 390$b$ via channel 320 and may perform the addition or subtraction of the two phase differences, as well as calculate the system speed v 311, as described below.

The first one-way system includes a laser 340$a$ emitting a light beam from source 350$a$ in the direction of the system motion, through a vacuum path (or air path) 380$a$. The light beam is received at a receiver 352$a$. Delta d 370$a$ is the additional distance that the light beam travels because of the system motion. The light beam is split, and a second light path 382$a$ connects the laser 340$a$ directly through a fiber optic cable to the receiver. The output from the receiver (from both beams of light) is input to a phase comparator 390$a$ located at the receiver.

The second one-way system includes a laser 340$b$ emitting a light beam from source 350$b$ in the opposite direction of the system motion, through a vacuum path (or air path) 380$b$. The light beam is received at a receiver 352$b$. Delta d 370$b$ is the distance that the light beam does not have to travel because the beam is moving against the direction of system motion. The light beam is split, and a second light path 382$b$ connects the laser 340$b$ directly through a fiber optic cable to the receiver. The output from the receiver (from both beams of light) is input to a phase comparator 390$b$ located at the receiver.

Figure 6A:
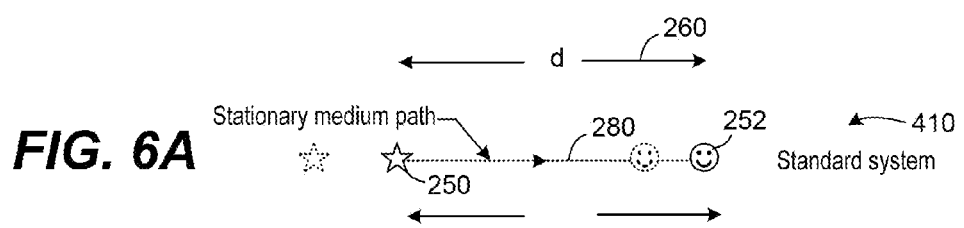
FIG. 6A shows a standard measurement system.
Figure 6B:
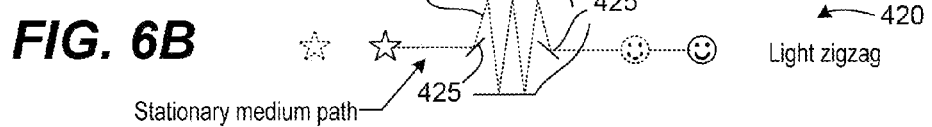
FIG. 6B shows the propagation path length being increased in the stationary medium by reflecting the light beam sideways using mirrors.
Figure 6C:
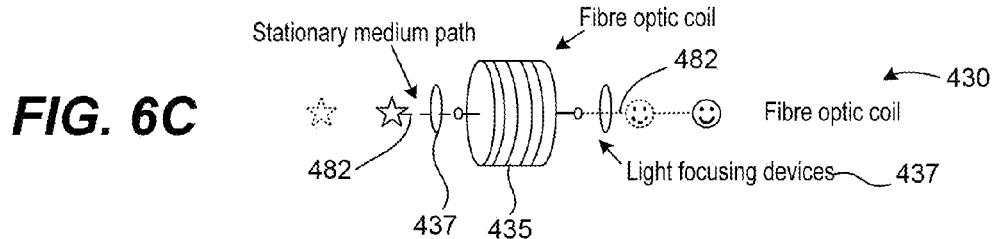
FIG. 6C shows the propagation path length increased in the stationary medium by passing the light beam through a fiber optic coil.

To improve sensitivity, or to keep the separation distance d small, the propagation path of the light beam (via the air path or vacuum path in the stationary medium) may be increased over the original distance d, as illustrated in FIGS. 6A, 6B and 6C. The propagation path delay does not have to be in the direction of motion, as long as the resulting delay causes a propagation delay in the propagation medium in the direction of motion. FIG. 6A shows a standard measurement system 410. A light beam travels from a source 250 to a receiver 252 via a path 280 through the stationary propagation medium, the source and receiver being separated by a distance d 260. When system 410 has a velocity, the light beam travels an extra Δd, 270.

FIG. 6B illustrates the propagation path length being increased in the stationary medium by reflecting the light beam sideways using mirrors 425 forming a light zigzag path 481, all moving with the system 420 having a velocity v. The source and receiver are still separated by distance d 260. The propagation path length traveled by the light beam from source to receiver is increased over d, not only by the longer zigzag path 481, but also due to the extra movement of the receiver away from the source emission point, through the extra propagation delay (distance traveled in the zigzag), and the velocity of system 420.

FIG. 6C shows the propagation path length increased in the stationary medium by passing the light beam through a fiber optic coil 435, also moving with system 430, for a portion of the propagation path. The light beam travels on a path 482 through the stationary medium (e.g., via air or vacuum) before entering coil 435 and after exiting coil 435. In order to maximize the light transfer from the stationary medium to the fiber coil and from the fiber coil to stationary medium, light focusing devices 437 (lenses or equivalent) may be used, also moving with the system. The propagation path length traveled by the light beam from source to receiver is increased over d, not only by the longer path through the fiber optic coil, but also due to movement of the receiver away from the source emission point because of the velocity of system through the extra propagation delay (time traveled in the fiber optic coil), and the velocity of system 430. The fiber coil may be directly connected to the source as long as there exists an air gap (or vacuum gap) on the detector side, thus causing the light beam to travel farther in the medium when it is traveling in the direction of system motion.

Mode of Operation

The propagation distance in the propagation medium (whether in a vacuum in space or in an air path on Earth, for example), as illustrated in FIG. 4, is d when the system 200 is stationary, i.e., v=0. The propagation distance becomes d+Δd with the system in motion, the light beam moving in the direction of motion, relative to the propagation medium. This propagation distance increase (or decrease) produces a propagation time difference and therefore a phase difference at the phase comparator, compared with the light beam transmitted directly from the laser (source) to the phase comparator (receiver), through the fiber optic cable. Of course, if the system moves in the opposite direction the light beam will travel a distance d−Δd because the light beam is moving against the direction of motion.

The propagation time t between two stationary fixed points of separation d, is t=d/c. If the system moves at velocity v, then the incremental distance traveled by the system in time t' is Δd=vt'=v(d+Δd)/c=M(d+Δd), i.e., Δd=[M/(1−M)]d≈Md for M=v/c≪1, M is typically $10^{-6}$ at Earth speeds. The incremental propagation time is then Δt=Mt, as shown below in Equation (2):

$$\Delta t = \Delta d/c = Md/c = Mt, \text{ and phase change } \Delta\phi = 2\pi f \Delta t,$$
$$\text{where } M = v/c \text{ and } t = d/c \quad (2)$$

If N is the number of interference fringes (2π phase rotations), f is the frequency and λ the wavelength of the source (e.g., a laser), then Equation (3) shows:

$$N = \Delta\phi/2\pi = f\Delta t = fvd/c^2 = fMd/c = Md/\lambda, \quad (3)$$

If v=300 m/s (670 miles/hour), c=3×10$^8$ m/s, M=10$^{-6}$, red laser λ=6×10$^{-7}$ m, f=c/λ=5×10$^{14}$ Hz, distance d=3 m, then N=10$^{-6}$×3×6$^{-1}$×10$^7$=5 fringes. Whereas for the Michelson and Morley Experiment (MMX), the round trip propagation time, in and against the direction of motion is $t_{MMX}$, where α is the Lorentz contraction factor. The incremental propagation time is then Δt≈M$^2$t, as shown below in Equations (4) and (5):

$$t_{MMX} = \alpha dc^{-1}[\{1/(1-M)\} + \{1/(1+M)\}] = \alpha dc^{-1} 2\alpha^{-2} = \alpha^{-1} 2d/c \approx (1 + M^2/2)(2d/c) \text{ and } \Delta t \approx M^2 t, t = d/c \quad (4)$$

$$\text{as } [\{1/(1-M)\} + \{1/(1+M)\}] = 2/\alpha^2 \text{ and } \alpha^2 = (1-M)(1+M) = (1-M^2) \quad (5)$$

Then, the number of expected fringes is shown by Equation (6):

$$N = f\Delta t = fM^2 d/c = M^2 d/\lambda = 10^{-12} \times 3 \times 6^{-1} \times 10^7 = 5 \times 10^{-6} \text{ fringes} \quad (6)$$

In other words, the MMX system, because of the M$^2$ term (rather than the M term in the present invention), is one million times less sensitive than the present invention at practical speeds. To increase the sensitivity of the present invention further, a dual system can be used, as illustrated in FIG. 5. Measuring the individual phase changes separately (both upstream and downstream) and adding their magnitudes increases the sensitivity to motion. The sensitivity can be increased still further, by increasing the propagation medium path length (thus increasing the propagation delay) without increasing the overall dimension d, by inserting a mirror zigzag or a coiled fiber optic cable, also moving with the system, as illustrated in FIGS. 6A, 6B and 6C.

Specific Embodiments

Figure 7:
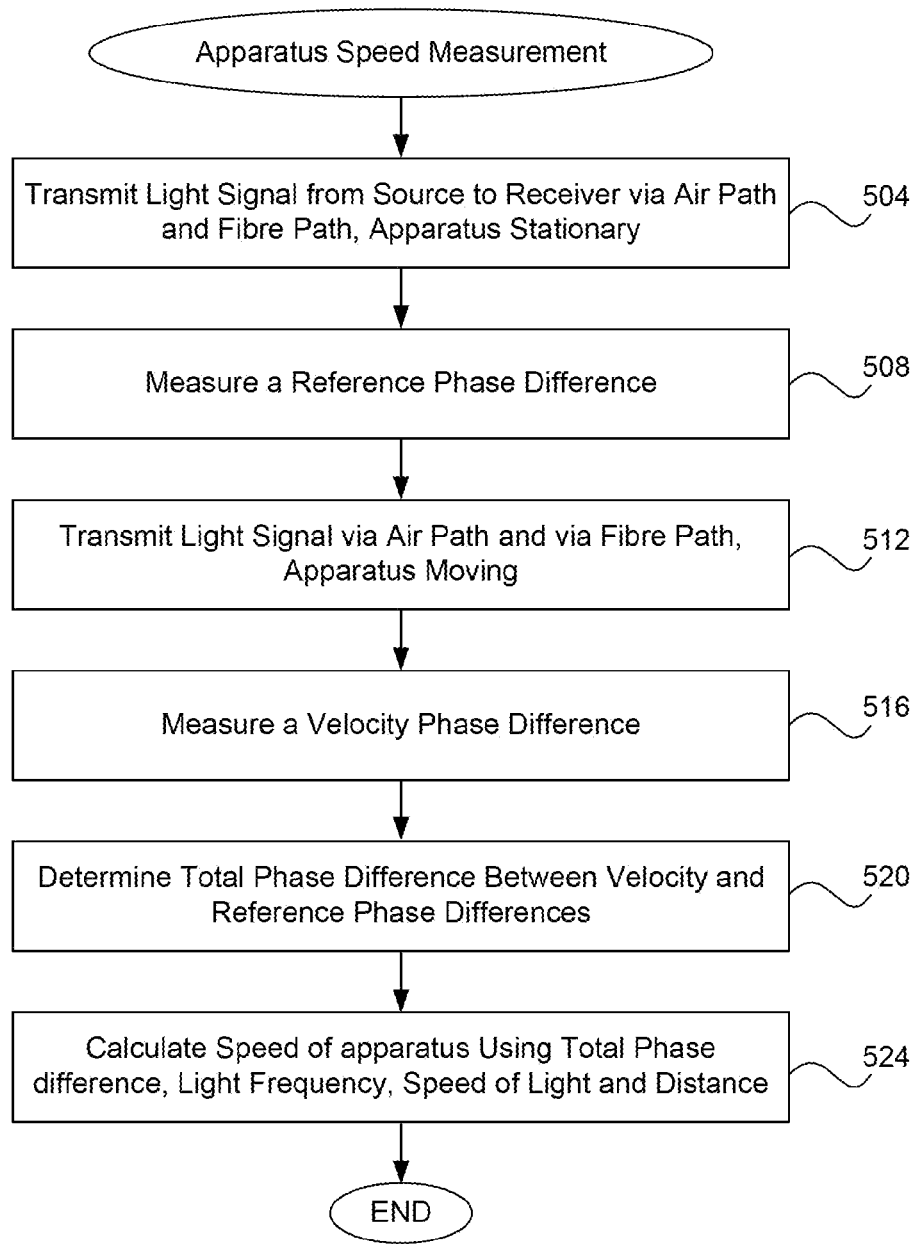
FIG. 7 is a flow diagram describing one specific embodiment by which the speed of a moving apparatus is measured.

FIG. 7 is a flow diagram describing one specific embodiment by which the speed of a moving apparatus is measured and is explained in the context of FIG. 4, although the invention is not limited to the embodiment of that figure. In general, the system does not measure absolute velocity; it measures velocity relative to the propagation medium, whether the medium is stationary on the Earth's surface or at rest in space. For absolute motion the velocity of the propagation medium relative to absolute space has to be taken into account.

In a first step 504 light from a laser 240 is transmitted via two different paths from a source 250 to a receiver 252 when the apparatus is at rest with respect to the stationary medium (e.g., with respect to the surface of the Earth). The laser may be split using a conventional beam splitter in order to direct the beam via two different paths, although other techniques such as a light siphoning may also be used to direct the laser beam down the two different paths. As mentioned above, the reference signal may instead use a photoelectric converter at the source to turn the light signal into an electrical signal. Preferably, the two beams are from a common source so if the phase of the source changes it will change in both paths. Further, although a laser is described as the light source, any coherent directional electromagnetic source with a short enough wavelength can be used, such as a microwave source (e.g., a maser). In general, the smaller the wavelength of the electromagnetic source (the higher the frequency), the more accurate the measurement will be. Electromagnetic radiation having frequencies higher than that of visible light (e.g., ultraviolet, x-rays and gamma rays) may also be used in principle.

The stationary medium path 280 is one of the two paths that the light beam traverses. On this path, there is relative motion (between the measurement system and the propagation medium) when the system is in motion and the light beam will travel a distance longer than d when the laser is shining in the direction of motion of the apparatus. When the apparatus is at rest with respect to the stationary medium (e.g., at rest on the surface of the Earth), then the light beam will travel a distance d on this path. On this path the beam may be traveling through air, vacuum, a partial vacuum, a gas, etc. There will be relative motion between the measurement system and the propagation medium through which the light travels when the system is in motion. Via this path 280, the light beam travels a distance greater than d (when the apparatus is in motion) because of the relative motion.

By contrast, the second path, path 282, is a path in which the beam of light will always travel a fixed distance, regardless of the velocity of the apparatus. In this example, the beam of light on path 282 travels the entire distance on a fiber optic cable between the laser and the receiver. Because the fiber optic cable is attached to both the laser and the receiver, there is no relative motion as the beam of light travels from the laser to the receiver (i.e., the source, fiber cable, and receiver all travel together). Accordingly, the distance traveled by the light beam (and the time it takes) is independent of the speed of the system and this path may be used as a reference. As mentioned previously, the light source may be converted to an electrical signal on this second path and transmitted in a metal wire directly to the comparator.

In addition, it is not strictly necessary that a light beam from a laser travel via path 282. Any electromagnetic signal that originates in conjunction with the laser source may be sent via a fixed propagation distance through which the electromagnetic signal can propagate. For example, an electrical signal generated at the laser source may be sent via a copper wire that connects the laser directly to the comparator. In this example, the phase comparator 290 would detect the phase difference between the laser beam arriving via path 280 and photo electric converter and the electrical signal arriving via path 282. Preferably, the signal has a very small wavelength making measurement more accurate. As mentioned above, the electromagnetic signal be taken directly from the laser or a small air gap may be used.

Preferably, the laser via path 280 is shining in the direction of motion of the apparatus, that is, in the direction of velocity 211. Minor variations in the direction of the laser different from the direction of motion will affect the final speed calculation, making it appear as if the apparatus is traveling slower than it actually is. Depending upon the application, this error in the speed calculation may be within a margin of error that is acceptable for the application. In an alternative embodiment, it is contemplated that the laser via path 280 may be shining at a known angle off of the direction of motion of the apparatus. For example, the path from the source to the receiver may be at a 45° angle from the direction of motion. A straightforward mathematical calculation may then be used to adjust for this known angle in order to obtain the correct speed of the apparatus. Shining the laser at a known angle, however, will not result in a final speed calculation that is as accurate as shining the laser in the direction of motion.

In another alternative embodiment, the laser via path 280 may be scanned from side to side (or up and down) about a believed direction of motion in order to determine the actual direction of motion. Because the largest phase difference (with respect to the laser via path 282) will occur when the laser via path 280 is pointed in the direction of motion, the direction of motion can be determined when the largest phase difference is detected as the laser is scanned, either manually or automatically. This technique may be used to orient the laser in the direction of motion.

In step 508 the phase comparator 290 located at the receiver measures the phase difference between the two light beams received via paths 280 and 288 while the apparatus is at rest. As mentioned, these light signals are preferably converted to electrical signals through a photoelectric converter. In the case of electromagnetic radiation outside the spectrum of visible light other types of converters may be used. For example, for wavelengths longer than that of visible light (e.g., a maser) a radio receiver may be used, and for wavelengths shorter than that of visible light (e.g., for ultraviolet) a photoelectric converter with UV bandwidth may be used. For ease of explanation, all of these types of converters that convert electromagnetic radiation to an electrical signal will be referred to as "photoelectric converters."

Then, any instrument or dedicated system able to measure electrical time histories, able to compare and measure different phases, may be used. Examples of types of phase comparators that may be used include a dual beam oscilloscope or a computer with a digital time history capture facility and phase comparison software. This phase difference is referred to as a reference phase difference because it measures the phase difference when the apparatus is at rest or at another known speed. The comparator need not necessarily be aware of how many times the phase repeats itself (number of $2\pi$ radians), it may simply measure the overall phase difference.

The system always measures the velocity of the apparatus compared to the surrounding propagation medium, i.e., the final speed calculated in step 524 will be the speed of the apparatus with respect to the medium. If the medium is moving then its total (absolute) speed will be the system speed relative to the medium plus the medium's speed relative to the medium at rest in space away from any gravitational bodies (Universe). The reference phase difference (at zero velocity) can be measured while the apparatus is at rest with the medium on the surface of the Earth, or at rest with the medium in space.

In step 512 the light beam is again transmitted via the air path 280 and via the fiber optic path 282 while the apparatus is in motion with respect to the surface of the Earth (and with respect to the stationary propagation medium) and has a velocity v. In step 516 a phase difference is measured at the phase comparator 290 between the two beams that have traveled along different paths. Because the apparatus is now in motion, the distance traveled by the light beam over the air path 280 will now be a distance d plus a distance $\Delta d$ (resulting in a phase difference with respect to the measurement made in step 508).

Accordingly, in step 520 a total phase difference is determined between the phase difference measurements in step 508 and the phase difference measured in step 516. In one embodiment, the reference phase difference from step 508 is subtracted from the velocity phase difference from step 516 to provide the total phase difference. For example, if $L_v$ is the light source phase common to both paths 280 and 282, $S_v$ is the vacuum signal path delay phase at a velocity v, and R is the reference path phase independent of v, then the comparator velocity phase difference at velocity v is given by:

$$\Delta \phi_V = (L_v + S_v) - (L_v + R) = S_v - R \tag{7}$$

In other words, Equation (7) is independent of light source $L_v$ phase variations. At zero velocity the reference phase difference at the comparator will be $(L_v' + S_o) - (L_v' + R)$ and the phase difference between this and Equation (7) is:

$$\Delta \phi_v = [(L_v + S_v) - (L_v + R)] - [(L_v' + S_o) - (L_v' + R)] = S_v - R - (S_o - R) = S_v - S_o \tag{8}$$

If there is no reference path R then Equation (8) becomes $$\Delta \phi_v = (L_v + S_v) - (L_v' + S_o) = (L_v - L_v') + (S_v - S_o) \approx S_v - S_o \tag{9}$$

providing the light intensity variation ($L_v$–$L_v'$) is small compared to $S_v$–$S_o$.

This is the total phase difference (step 520) due to the velocity of the system. If the light source phase (frequency) is ultra stable, i.e., $L_v$ can be considered to be constant over the two measurements, the reference phase R, can be discarded. But this is not practical for light frequencies, where the phase differences that are being measured are very small indeed.

Next, in step 524 the speed of the apparatus (with respect to the surface of the Earth and the stationary propagation medium) is determined using the total phase difference, the frequency of the light beam, the speed of light via the air path and distance d 260. Because the phase difference is given by $\Delta\phi = 2\pi f \Delta t$, this means that $\Delta t = \Delta\phi/2\pi f$. And, because $\Delta t = \Delta d/c = vt/c = vd/c^2$, where $t=d/c$, thus the velocity of the apparatus $v = \Delta t c^2/d$. Therefore, the velocity of the apparatus may be determined from the total phase difference, the light frequency, the speed of light and the fixed distance d.

In a similar fashion, the speed of a spacecraft or other object in outer space may also be calculated. The speed calculated will be relative to the propagation medium. The system does not measure absolute velocity; it only measures velocity relative to the propagation medium, whether the medium is stationary on the Earth's surface or at rest in space.

In another specific embodiment, the invention may be explained in the context of the two-way measurement system of FIG. 5. In this embodiment, phase comparator 390*a* detects a phase difference $+\Delta\phi$ while the system 300 has a velocity 311, and phase comparator 390*b* detects a phase difference $-\Delta\phi$ also while the system has a velocity 311. The two phase differences may then be used to determine the velocity of system. In this example, a reference phase difference at each comparator is measured when the system is at rest as has been described above in steps 504 and 508. Next, a velocity phase difference is measured as in step 516 for each comparator. A total phase difference is then determined for each comparator as in step 520 (i.e., a total phase difference in the direction of motion and a total phase difference against the direction of motion). The absolute value of each total phase difference is taken and half the value of the two values added together to produce a final value, as given in Equation (10) below. This final total phase difference may then be used in step 524 to determine the velocity of the system.

Figure 8:
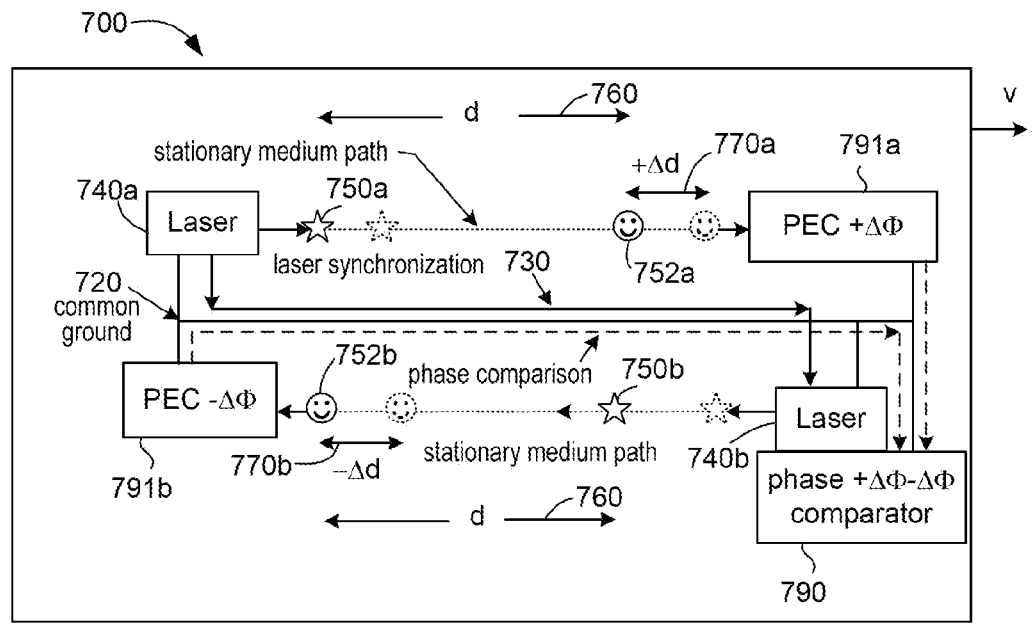
FIG. 8 is a block diagram of two-way measurement system comparing phase directly.

A second embodiment of the two-way system measurement is given in FIG. 8. Because two laser beams are used, and the distance each beam travels is dependent upon the velocity of the apparatus, no reference signal that travels a fixed distance is needed. As long as the two lasers are synchronized (i.e., are in phase) they may reference to each other. The output from the two photo-electric converters (PECs) 791*a,b* are now fed to, and measured by, the same phase comparator 790. There is now a common ground wire connection 720 between all components to complete the circuit and the two lasers are now synchronized through a synchronization wire connection 730 connecting the two lasers. The two lasers may be synchronized by using a phase-locked loop or equivalent system.

Using the same terminology as Equation (9), if $|S_v-S_o|_U$ is the modulus or magnitude of source phase with velocity, minus the source phase with zero velocity, for the upstream propagation, and $|S_v-S_o|_D$ is the value for downstream propagation, then the total phase with velocity v will be given by Equation (10):

$$\Delta\phi_v = \{|S_v-S_o|_U + |S_v-S_o|_D\}/2 = \{|\Delta\phi_v|_U + |-\Delta\phi_v|_D\}/2 \quad (10)$$

Figure 9:
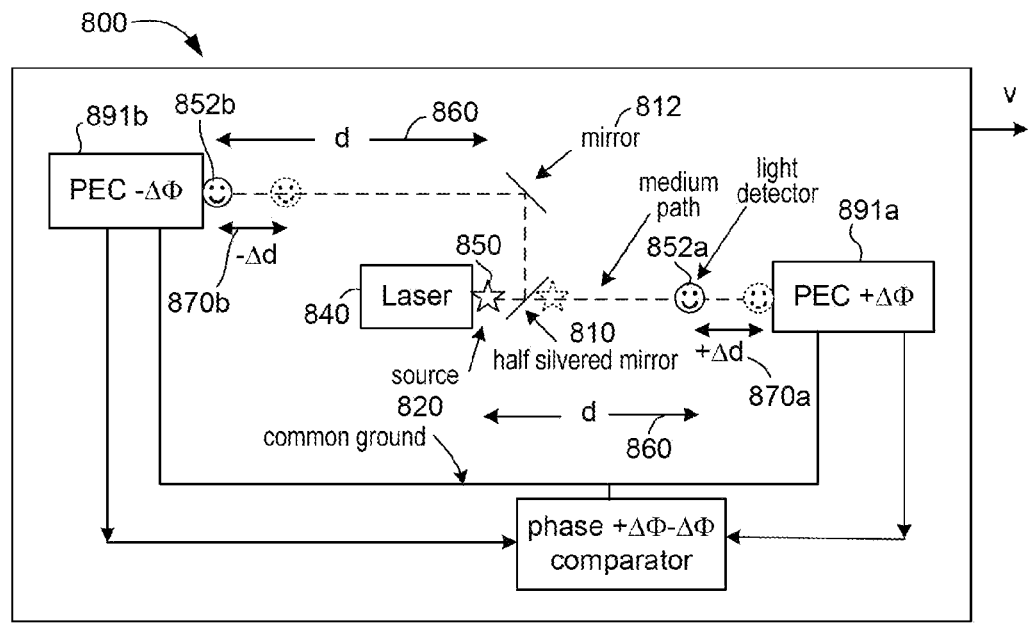
FIG. 9 is a block diagram showing two-way measurement system using a single laser.

A third embodiment of the two-way system measurement is given in FIG. 9. Here, a single laser 840 supplies the light for both light paths. Again, because two beams are used relative to each other, no reference signal that travels a fixed distance is needed. The beams are inherently synchronized because they emanate from the same laser. Laser 840 supplies the downstream path as usual (through a half-silvered glass 810), and the upstream path is caused by the half-silvered glass 810 and a mirror 812 to reverse the direction of the light. A common ground wire 820 is again provided to complete the connection. Again, the output from the two photo-electric converters (PECs) 891*a,b* are now fed to, and measured by, the same phase comparator 890.

In other specific embodiments, the invention may be explained in the context of systems 420 or 430 shown in FIGS. 6B and 6C. In the context of a system 420, the light beam follows a zigzag path 481 (or any other type of path other than a single linear path) from the source to the receiver via air or a vacuum. In other words, path 481 is substituted for path 280 in the measurement system of FIG. 4 and then calculations may be performed as described in FIG. 7 above. Path 481 may also be substituted for path 380*a* or 380*b* in the measurement system of FIG. 5.

In the context of system 430, the light beam follows a path that includes not only an air gap 482 but also a fiber optic path 435. In other words, this path of system 430 may be substituted for path 280 in the measurement system of FIG. 4 and then calculations may be performed as described in FIG. 7 above. This path system 430 may also be substituted for path 380*a* or 380*b* in the measurement system of FIG. 5.

Additional Embodiments

The present invention also includes additional embodiments which are listed below.

21. A method of measuring a velocity of an apparatus, said method comprising:

determining a first reference phase difference between a first coherent electromagnetic beam traveling via a first path at a reference velocity and said first beam traveling via a second path at said reference velocity, wherein a distance traveled via said first path is dependent upon said velocity, and wherein a distance traveled via said second path is independent of said velocity;

determining a second reference phase difference between a second coherent electromagnetic beam traveling via a third path at a reference velocity and said second beam traveling via a fourth path at said reference velocity, wherein a distance traveled via said third path being dependent upon said velocity, and wherein a distance traveled via said fourth path being independent of said velocity;

while said apparatus is at said velocity, determining a first velocity phase difference between said first beam traveling via said first path and said first beam traveling via said second path;

while said apparatus is at said velocity, determining a second velocity phase difference between said second beam traveling via said third path and said second beam traveling via said fourth path;

determining a first total phase difference between said first velocity phase difference and said first reference phase difference, and determining a second total phase difference between said second velocity phase difference and said second reference phase difference; and calculating said velocity of said apparatus using at least said first total phase difference, said second total phase difference, frequencies of said first and second light beams, and the speed of light.

22. A method as recited in claim 21 wherein said reference velocity is zero relative to the surface of the Earth.

23. A method as recited in claim 21 wherein said first beam traveling via said first path travels in the direction of said velocity of said apparatus, and wherein said second beam traveling via said third path travels in the opposite direction of said velocity of said apparatus.

24. A method as recited in claim 21 wherein said first beam traveling via said first path and said second beam traveling via said third path propagate in a propagation medium.

25. A method as recited in claim 21 further comprising:
adding together the magnitude of said first total phase difference and the magnitude of said second total phase difference and using this sum to perform said calculating said velocity.

26. An apparatus for calculating a velocity of said apparatus, said apparatus comprising:
a first photoelectric converter;
a second photoelectric converter;
a third photoelectric converter;
a fourth photoelectric converter;
a first source that generates a first coherent electromagnetic beam that is directed toward said first photoelectric converter via a first path and that is directed toward said second photoelectric converter via a second path, wherein a distance said first beam travels via said first path is dependent on any velocity of said apparatus, and wherein a distance said first beam travels via said second path is independent of any velocity of said apparatus;
a second source that generates a second coherent electromagnetic beam that is directed toward said third photoelectric converter via a third path and that is directed toward said fourth photoelectric converter via a fourth path, wherein a distance said second beam travels via said third path is dependent on any velocity of said apparatus, and wherein a distance said second beam travels via said fourth path is independent of any velocity of said apparatus;
a first phase comparator coupled to said first and second photoelectric converters, said first phase comparator being arranged to determine a first reference phase difference between said first beam traveling via said first path and said first beam traveling via said second path when said apparatus is at a reference velocity, said first phase comparator being further arranged to determine a first velocity phase difference between said first beam traveling via said first path and said first beam traveling via said second path when said apparatus is at said velocity;
a second phase comparator coupled to said third and fourth photoelectric converters, said second phase comparator being arranged to determine a second reference phase difference between said second beam traveling via said third path and said second beam traveling via said fourth path when said apparatus is at said reference velocity, said second phase comparator being further arranged to determine a second velocity phase difference between said second beam traveling via said third path and said second beam traveling via said fourth path when said apparatus is at said velocity; and
a computing device arranged to calculate said velocity of said apparatus using at least said first and second reference phase differences, said first and second velocity phase differences, frequencies of said first and second beams, and the speed of light.

Computer System Embodiment

Figure 10A:
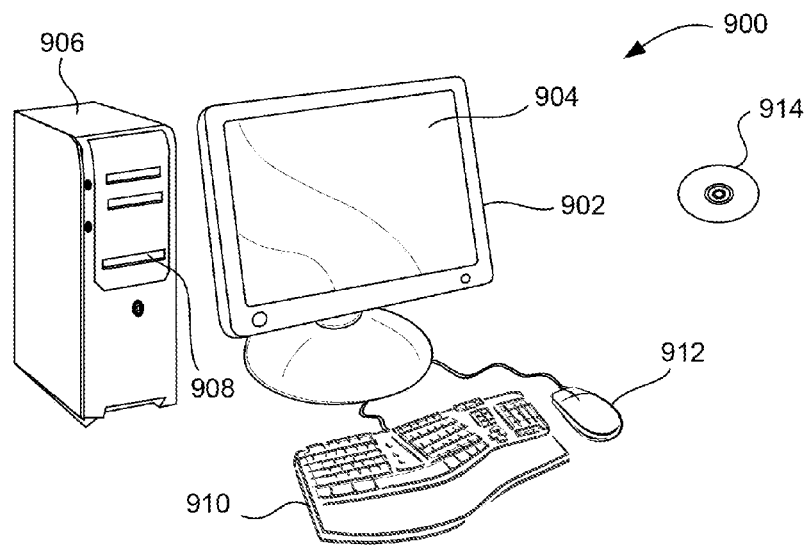
FIGS. 10A and 10B illustrate a computer system suitable for implementing embodiments of the present invention.
Figure 10B:
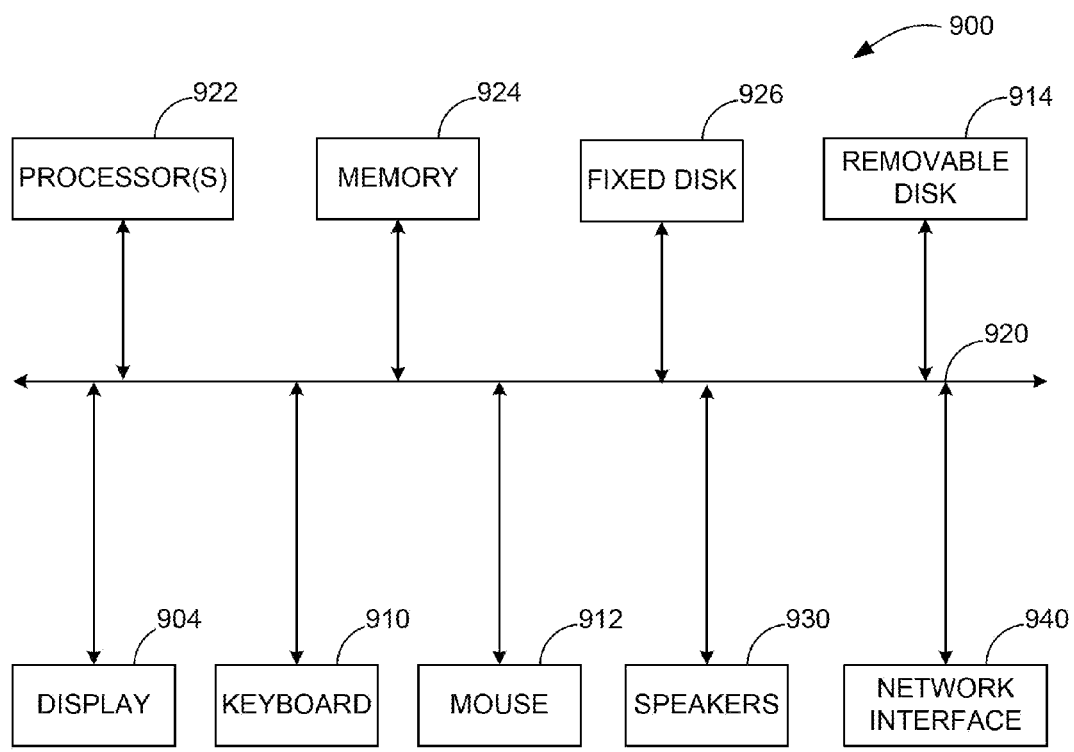

FIGS. 10A and 10B illustrate a computer system 900 suitable for implementing embodiments of the present invention. FIG. 10A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 10B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of measuring a velocity of an apparatus, said method comprising:
   while said apparatus is at a reference velocity, transmitting a coherent electromagnetic beam via a first path completely within said apparatus to a first receiver, wherein a distance said beam travels via said first path is dependent on any velocity of said apparatus;
   while said apparatus is at said reference velocity, transmitting said beam via a second path completely within said apparatus to a second receiver, wherein a distance said beam travels via said second path is independent of any velocity of said apparatus;
   determining a reference phase difference at said receivers between said beam traveling via said first path at said reference velocity and said beam traveling via said second path at said reference velocity;
   while said apparatus is at said velocity, determining a velocity phase difference at said receivers between said beam traveling via said first path and said beam traveling via said second path;
   determining a total phase difference between said velocity phase difference and said reference phase difference; and
   calculating said velocity of said apparatus using at least said total phase difference, a frequency of said beam, and the speed of light.

2. A method as recited in claim 1 wherein said reference velocity is zero relative to the surface of the Earth.

3. A method as recited in claim 1 wherein said beam traveling via said first path travels in the direction of said velocity of said apparatus.

4. A method as recited in claim 1 wherein said beam traveling via said first path propagates in a propagation medium.

5. The method as recited in claim 4 wherein the permeability of said propagation medium in a vacuum is $\mu = 1.25 \times 10^{-6}$ N/A$^2$ and wherein the permittivity of said propagation medium in a vacuum is $\epsilon = 8.85 \times 10^{-12}$ F/m.

6. A method as recited in claim 1 wherein said first path includes a zigzag portion.

7. A method as recited in claim 1 wherein said first path includes a solid medium that is longer than the distance between a source of said beam and said first receiver.

8. The method as recited in claim 1 wherein while said apparatus is at said velocity, said beam via said first path and said beam via said second path are only incident upon portions of said apparatus that are moving at said velocity.

9. The method as recited in claim 1 wherein said electromagnetic beam is a laser, wherein said first and second receivers are the same receiver, and wherein said determining a reference phase difference and said determining a velocity phase difference use interference.

10. An apparatus for calculating a velocity of said apparatus, said apparatus comprising:
    a first receiver;
    a second receiver;
    a source that generates a coherent electromagnetic beam that is directed toward said first receiver via a first path completely within said apparatus and that is directed toward said second receiver via a second path completely within said apparatus, wherein a distance said beam travels via said first path is dependent on any velocity of said apparatus, and wherein a distance said beam travels via said second path is independent of any velocity of said apparatus;
    a phase comparator coupled to said first and second receivers, said phase comparator being arranged to determine a reference phase difference between said beam traveling via said first path and said beam traveling via said second path when said apparatus is at a reference velocity, said phase comparator being further arranged to determine a velocity phase difference between said beam traveling via said first path and said beam traveling via said second path when said apparatus is at said velocity; and
    a computing device arranged to calculate said velocity of said apparatus using at least said reference phase difference, said velocity phase difference, a frequency of said beam, and the speed of light.

11. An apparatus as recited in claim 10 wherein said reference velocity is zero relative to the surface of the Earth.

12. An apparatus as recited in claim 10 wherein said first path is a straight line.

13. An apparatus as recited in claim 10 wherein said beam traveling via said first path propagates in a propagation medium.

14. The apparatus as recited in claim 13 wherein the permeability of said propagation medium in a vacuum is $\mu = 1.25 \times 10^{-6}$ N/A$^2$ and wherein the permittivity of said propagation medium in a vacuum is $\epsilon = 8.85 \times 10^{-12}$ F/m.

15. An apparatus as recited in claim 10 wherein said first path includes a zigzag portion.

16. An apparatus as recited in claim 10 wherein said first path includes a solid medium that is longer than the distance between said source and said first receiver.

17. An apparatus as recited in claim 10 further comprising:
    a beam splitter that splits said beam from said source into a first beam traveling via said first path and a second beam traveling via said second path, wherein said second receiver is located at the end of said second path.

18. An apparatus as recited in claim 10 wherein said second receiver is located in physical contact with said source, said apparatus further comprising:
    an electrical conductor that conducts a signal from said second receiver to said phase comparator.

19. The apparatus as recited in claim 10 wherein said beam via said first path and said beam via said second path are only incident upon portions of said apparatus.

20. The apparatus as recited in claim 10 wherein said electromagnetic beam is a laser, wherein said first and second receivers are the same receiver, and wherein said phase comparator being further arranged to determine said reference phase difference and to determine said velocity phase difference using interference.

21. A method of measuring a velocity of an apparatus, said method comprising:
    while said apparatus is at a reference velocity, transmitting a first coherent electromagnetic beam via a first path completely within said apparatus to a first receiver, wherein a distance said first beam travels via said first path is dependent on any velocity of said apparatus;
    while said apparatus is at said reference velocity, transmitting a second coherent electromagnetic beam via a second path completely within said apparatus in a direction opposite to said first beam to a second receiver, wherein a distance said second beam travels via said second path is dependent of any velocity of said apparatus, said second beam being in phase with said first beam;

determining a reference phase difference at said receivers between said first beam traveling via said first path at said reference velocity and said second beam traveling via said second path at said reference velocity;

while said apparatus is at said velocity, determining a velocity phase difference at said receivers between said first beam traveling via said first path and said second beam traveling via said second path;

determining a total phase difference between said velocity phase difference and said reference phase difference; and calculating said velocity of said apparatus using at least said total phase difference, a frequency of said first beam, and the speed of light.

22. A method as recited in claim 21 wherein said first and second beams originate from different sources, said method further comprising:

synchronizing said different sources so that said second beam is in phase with said first beam.

23. A method as recited in claim 21 wherein said first and second beams originate from a single source.

24. The method as recited in claim 21 wherein while said apparatus is at said velocity, said beam via said first path and said beam via said second path are only incident upon portions of said apparatus that are moving at said velocity.

25. The method as recited in claim 21 wherein said beam traveling via said first path propagates in a propagation medium, and wherein the permeability of said propagation medium in a vacuum is $\mu=1.25\times10^{-6}$ N/A$^2$ and wherein the permittivity of said propagation medium in a vacuum is $\epsilon=8.85\times10^{-12}$ F/m.

26. The method as recited in claim 21 wherein said electromagnetic beam is a laser, wherein said first and second receivers are the same receiver, and wherein said determining a reference phase difference and said determining a velocity phase difference use interference.

27. An apparatus for calculating a velocity of said apparatus, said apparatus comprising:

a first receiver;

a second receiver;

a source that generates a coherent electromagnetic beam that is directed toward said first receiver via a first path completely within said apparatus and that is directed toward said second receiver via a second path completely within said apparatus, wherein a distance said electromagnetic beam travels via said first path and via said second path is dependent on any velocity of said apparatus;

a phase comparator coupled to said first and second receivers, said phase comparator being arranged to determine a reference phase difference between said electromagnetic beam traveling via said first path and said electromagnetic beam traveling via said second path when said apparatus is at a reference velocity, said phase comparator being further arranged to determine a velocity phase difference between said electromagnetic beam traveling via said first path and said electromagnetic beam traveling via said second path when said apparatus is at said velocity; and a computing device arranged to calculate said velocity of said apparatus using at least said reference phase difference, said velocity phase difference, a frequency of said electromagnetic beam, and the speed of light.

28. An apparatus as recited in claim 27 wherein said electromagnetic beam propagates in a propagation medium.

29. The apparatus as recited in claim 28 wherein the permeability of said propagation medium in a vacuum is $\mu=1.25\times10^{-6}$ N/A$^2$ and wherein the permittivity of said propagation medium in a vacuum is $\epsilon=8.85\times10^{-12}$ F/m.

30. An apparatus as recited in claim 27 wherein said source includes a first source that generates a first coherent electromagnetic beam via said first path and a second source that generates a second coherent electromagnetic beam via said second path, said apparatus further comprising:

a synchronization mechanism for synchronizing said first and second sources such that said first and second beams are in phase upon leaving said respective first and second sources.

31. The apparatus as recited in claim 27 wherein said beam via said first path and said beam via said second path are only incident upon portions of said apparatus.

32. The apparatus as recited in claim 27 wherein said electromagnetic beam is a laser, wherein said first and second receivers are the same receiver, and wherein said phase comparator being further arranged to determine said reference phase difference and to determine said velocity phase difference using interference.

* * * * *